(12) United States Patent
Hayslett et al.

(10) Patent No.: US 12,107,615 B2
(45) Date of Patent: Oct. 1, 2024

(54) COMPACT TRANSCEIVER

(71) Applicant: BAE Systems Information and Electronic Systems Integration Inc., Nashua, NH (US)

(72) Inventors: Tyler M. Hayslett, Nashua, NH (US); Christopher Alix, Barrington, NH (US); Nathan Alix, Epsom, NH (US); Timothy Del Signore, Brookline, NH (US); Eric G. Schneider, Brookline, NH (US); Christopher A. Straw, Fremont, NH (US); Michael A. Young, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 326 days.

(21) Appl. No.: 17/655,586

(22) Filed: Mar. 21, 2022

(65) Prior Publication Data
US 2023/0299809 A1 Sep. 21, 2023

(51) Int. Cl.
*H04B 1/40* (2015.01)
(52) U.S. Cl.
CPC ................................ *H04B 1/40* (2013.01)
(58) Field of Classification Search
CPC . H04B 1/40; H04B 1/18; H04B 17/14; H04B 1/0475; H04B 1/525; H04B 1/006; H04B 1/10; H04B 1/0057; H04B 1/0458; H04B 1/1036; H04B 1/50; H04B 17/101; H04B 17/104; H04B 7/08; H04B 1/109; H04B 1/123; H04B 1/406
USPC ........................................................... 455/73
See application file for complete search history.

(56) References Cited

U.S. PATENT DOCUMENTS

| | | | |
|---|---|---|---|
| 2011/0279736 A1* | 11/2011 | Tang | H04B 17/354 348/731 |
| 2014/0134586 A1* | 5/2014 | Stein | A61B 34/20 434/262 |
| 2018/0248630 A1* | 8/2018 | Heimbuch | G02B 6/122 |
| 2020/0169285 A1* | 5/2020 | Arfaei Malekzadeh | H04B 1/0475 |

* cited by examiner

*Primary Examiner* — Ajibola A Akinyemi
(74) *Attorney, Agent, or Firm* — Gary McFaline

(57) ABSTRACT

A transceiver unit includes an enclosure, a first input port, a second input port, a first output port, and a second output port. A radio frequency (RF) pass-through path is within the enclosure between the first input port and the first output port and includes a gain module. The RF pass-through path is configured to receive a first RF signal at the first input port and to transmit a second RF signal at the first output port. The gain module is configured to amplify the first RF signal to produce the second RF signal. The transceiver unit further includes a transceiver path within the enclosure between the second input port and the second output port, the transceiver path including a signal processor.

15 Claims, 7 Drawing Sheets

COMPACT TRANSCEIVER

STATEMENT OF GOVERNMENT INTEREST

This invention was made with United States Government assistance under Contract No. 6534862860, awarded by the United States Government. The United States Government has certain rights in this invention.

FIELD OF DISCLOSURE

The present disclosure relates to radio signal transceivers, and more particularly, to a compact transceiver.

BACKGROUND

A transceiver is a device capable of receiving and transmitting signals. For example, transceivers can be used for two-way radio communication of voice and/or data. Because transceivers perform multiple functions, they can consume significant amounts of power and have numerous components that must be packaged together. These power and size attributes can limit the range of applications for which such transceivers are of practicable use.

Although the following detailed description will proceed with reference being made to illustrative embodiments, many alternatives, modifications, and variations thereof will be apparent in light of this disclosure. Figures are not drawn to scale.

DETAILED DESCRIPTION

In accordance with an embodiment of the present disclosure, a transceiver includes an enclosure, a first input port, a second input port, a first output port, and a second output port. A radio frequency (RF) pass-through path is within the enclosure between the first input port and the first output port and includes a gain module. The RF pass-through path is configured to receive a first RF signal at the first input port and to transmit a second RF signal at the first output port. The gain module is configured to amplify the first RF signal to produce the second RF signal. The transceiver further includes a transceiver path within the enclosure between the second input port and the second output port, the transceiver path including a signal processor and is configured to receive a third RF signal at the second input port and to transmit a fourth RF signal at the second output port. The signal processor is configured to process the third RF signal and the fourth RF signal at an intermediate frequency that is less than the RF input frequency and the RF output frequency. In some examples, the transceiver unit includes a non-hermetic, parylene-coated circuit board.

General Overview

In accordance with an embodiment of the present disclosure, a compact, printed circuit board (PCB)-based transceiver is provided. The transceiver is configured to receive and transmit signals within a high frequency band of approximately 20 GHz to approximately 40 GHz and within a low frequency band of approximately 6 GHz to approximately 18 GHz. In some examples, components of the transceiver are housed within a 1.56-inch by 3.0-inch enclosure. In some examples, the transceiver is configured to use, in operation, less than approximately 24 watts DC of power. The transceiver is further configured to provide multiple functions, including RF up and down conversion, clocking, local oscillator (LO) tuning, analog-to-digital signal conversion (ADC), digital signal processing, digital-to-analog signal conversion (DAC), and power conversion in a single unit enclosure.

Transceiver Device with Low Band and High Band Paths

Figure 1:
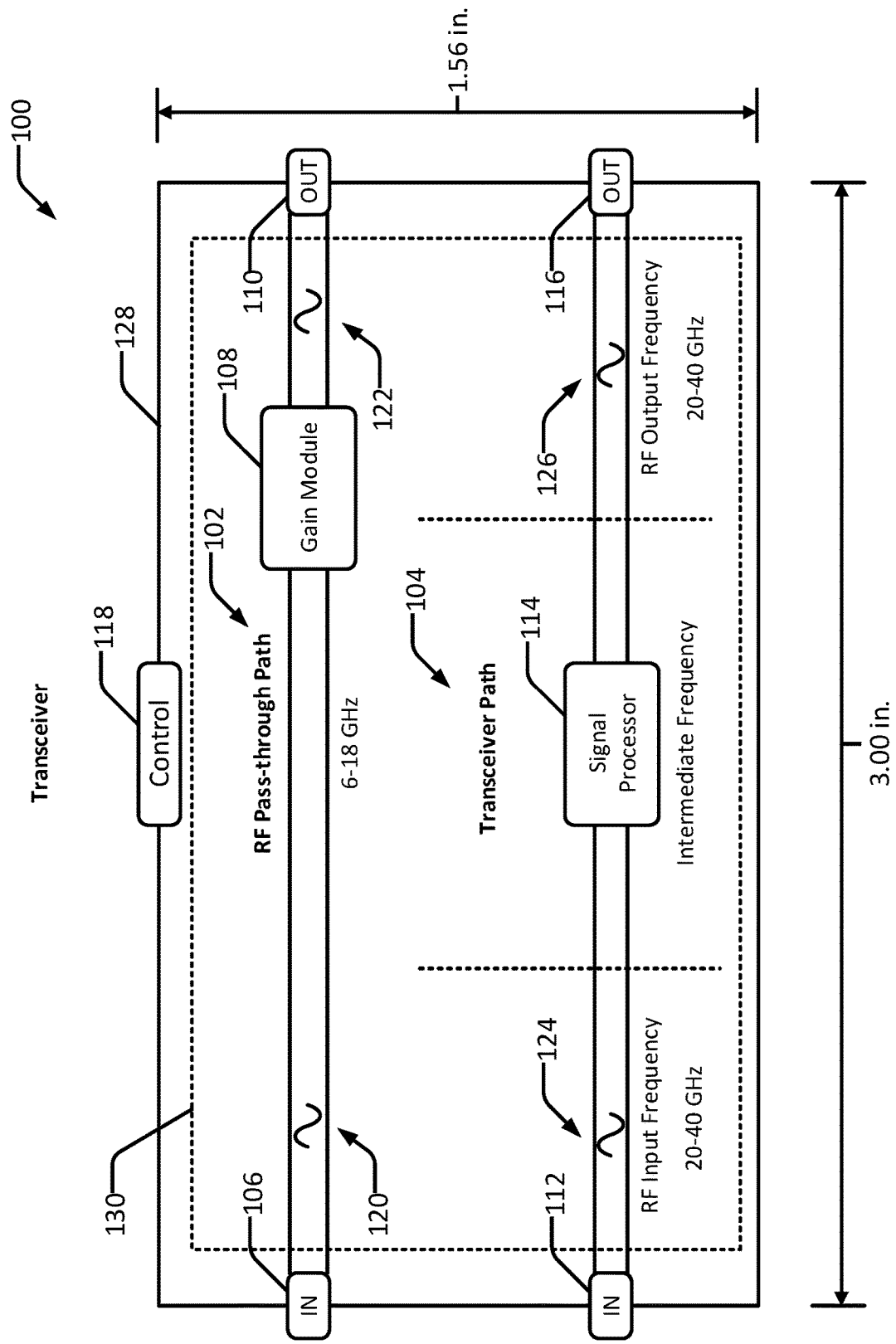
FIG. 1 is a block diagram of a transceiver, in accordance with an embodiment of the present disclosure.

FIG. 1 is a block diagram of a transceiver 100, in accordance with an embodiment of the present disclosure. The transceiver 100 includes a low band (LB) radio frequency (RF) pass-through path 102 and a high band (HB) transceiver path 104. The RF pass-through path 102 includes a first input port 106, a gain module 108, and a first output port 110. The transceiver path 104 includes a second input port 112, a signal processor 114, and a second output port 116. The transceiver 100 further includes a control port 118 operatively coupled to the RF pass-through path 102 and the transceiver path 104.

In some examples, the RF pass-through path 102 is configured to receive a first RF signal 120 at the first input port 106 and to transmit a second RF signal 122 at the first output port 110. The first RF signal 120 and the second RF signal 122 can each have, for example, a frequency between approximately 6 GHz and approximately 18 GHz. The gain module 108 is configured to amplify the first RF signal 120 to produce the second RF signal 122.

In some examples, the transceiver path 104 is configured to receive a third RF signal 124 at the second input port 112 and to transmit a fourth RF signal 126 at the second output port 116. The third RF signal 124 and the fourth RF signal 126 can each have, for example, a frequency between approximately 20 GHz and approximately 40 GHz at the input port 112 and the output port 116, respectively. The signal processor 114 is configured to process the third RF signal 124 and the fourth RF signal 126 at an intermediate frequency. The intermediate frequency can be obtained, for instance, by down conversion from the third RF signal 124 and up conversion to the fourth RF signal 126, such as described with respect to FIGS. 2, 4, and 5.

The control port 118 is configured to permit external control, monitoring, data transfer, and/or synchronization of the transceiver 100, and to provide power (e.g., direct current or DC power) to the transceiver 100 for powering the gain module 108, the signal processor 114, and other components of the transceiver 100, such as described with respect to FIGS. 2-6. For example, the control port 118 may permit an external device, such as a computer, to send and receive data to and from the signal processor 114, and for otherwise controlling the operation of the transceiver 100.

In some examples, the transceiver 100 includes an enclosure 128 containing the RF pass-through path 102, the gain module 108, the transceiver path 104, the signal processor 114, the input ports 106, 112, the output ports 110, 116, and the control port 118. In some examples, the external dimensions of the enclosure 128 are approximately 3.00 inches (length) by approximately 1.56 inches (width) by approximately 0.62 inches (height), thus providing a compact volume of the transceiver 100.

In some examples, one or more of the components of the transceiver 100, including the RF pass-through path 102, the gain module 108, the transceiver path 104, and the signal processor 114, are located on a non-hermetic, parylene-coated circuit board 130. In some examples, the enclosure 128 includes internal walls and/or internal gaskets for isolation of the various components and weep holes for draining any accumulated moisture from the enclosure 128 and for ventilation of the enclosure 128 (e.g., the enclosure 128 is not hermetically sealed). In some examples, the enclosure 128 is made of metal or other material suitable for providing physical and electromagnetic shielding of the internal transceiver 100 components.

Low Band and High Band Paths

Figure 2:
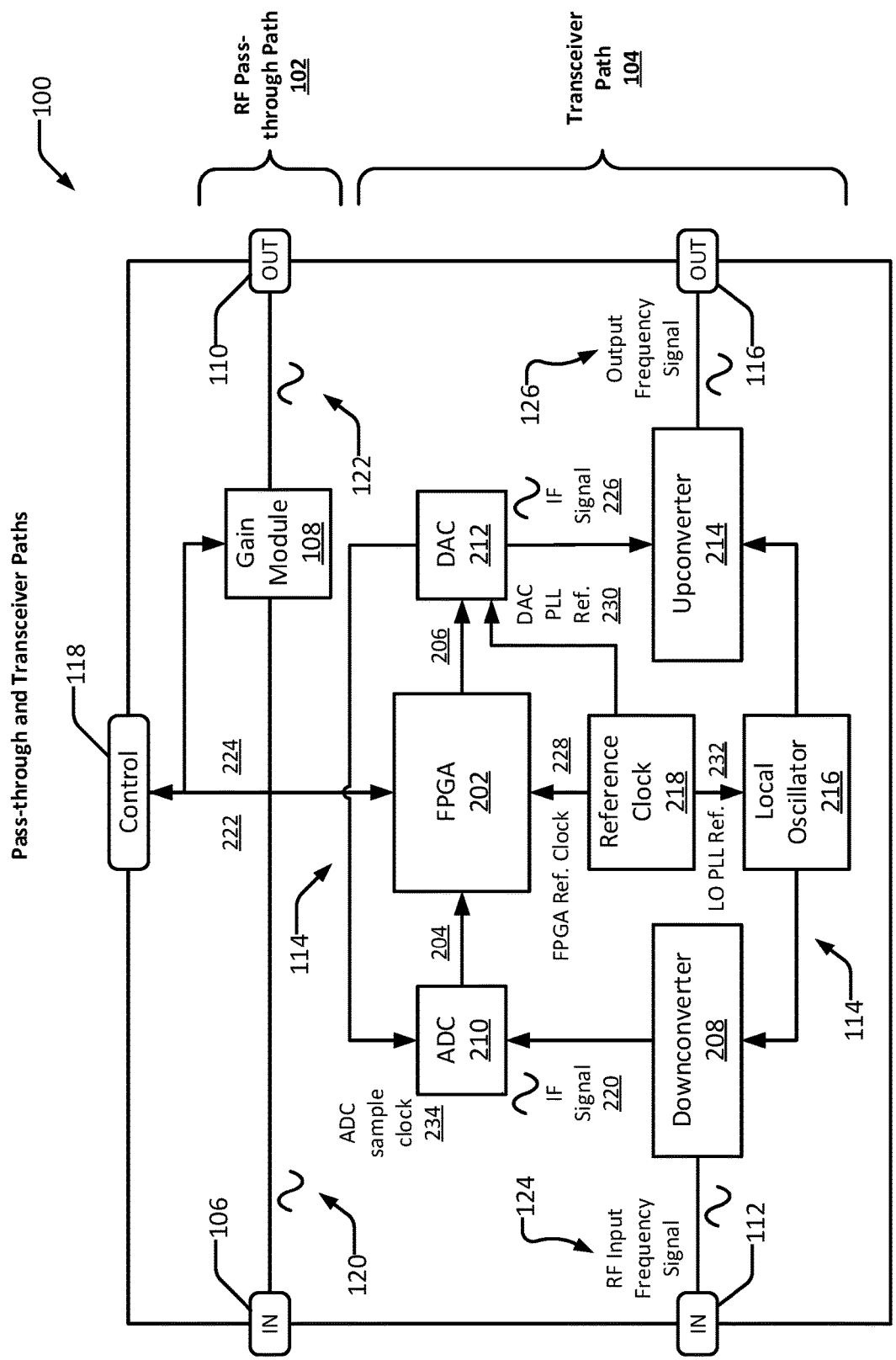
FIG. 2 is a block diagram of an RF pass-through path, a transceiver path, and other components of the transceiver of FIG. 1, in accordance with an embodiment of the present disclosure.

FIG. 2 is a block diagram of the RF pass-through path 102, the gain module 108, the transceiver path 104, the signal processor 114, and other components of the transceiver 100 of FIG. 1, in accordance with an embodiment of the present disclosure. The signal processor 114 includes a field programmable gate array (FPGA) 202 or other suitable logic circuit configured to process input and output digital signals 204 and 206. The transceiver path 104 includes a downconverter 208, an analog-to-digital signal converter (ADC) 210, a digital-to-analog signal converter (DAC) 212, an upconverter 214, a local oscillator (LO) 216, and a reference clock 218. In some examples, the reference clock 218 is configured to generate a reference signal having a frequency of approximately 300 MHz. The LO 216 is an oscillator used with a mixer to the change the frequency of an input signal.

In operation of the RF pass-through path 102, the gain module 108 is configured to amplify (increase the power of) the first RF signal 120, which is received via the input port 106, to produce the second RF signal 122, which is output via the output port 110. In some examples, the RF pass-through path 102 operates independently of the transceiver path 104.

In a first mode of operation of the transceiver path 104, the downconverter 208 converts the third RF signal 124, which is input at the input port 112, from the RF input frequency (e.g., 20-40 GHz) to a first intermediate frequency signal 220 having a frequency that is different from the RF input frequency (e.g., the intermediate frequency is lower than the RF input frequency but higher than the baseband frequency). The ADC 210 converts the first intermediate frequency signal 220 into the input digital signal 204, which is an input to the FPGA 202. The FPGA 202 is configured to process the input digital signal 204 and send data 222 (e.g., data encoded in or otherwise associated with the input digital signal 204) to the control port 118.

In a second mode of operation of the transceiver path 104, the FPGA 202 is configured to receive data 224 from the control port 118 and to generate the output digital signal 206, which is an output from the FPGA 202. The DAC 212 converts the output digital signal 206 into a second intermediate frequency signal 226 having a frequency that is different from the RF output frequency (e.g., the intermediate frequency is lower than the RF output frequency but higher than the baseband frequency). The upconverter 214 converts the second intermediate frequency signal 226 into the fourth RF signal 126, which is output at the output port 116. The first and second modes of operation of the transceiver path 104 can occur concurrently.

In both the first and second modes of operation of the transceiver path 104, the reference clock 218 generates a reference clock signal 228 that clocks the FPGA 202, a DAC phase lock loop (PLL) reference clock that feeds the DAC's internal PLL, which generates a sample clock that clocks the DAC, and a LO PLL reference clock 232 that clocks the LO 216. The DAC 212 generates an ADC sample clock 234 that clocks the ADC 210. In this manner, the ADC 210 is clocked by the DAC 212, which provides more efficient synchronization of signal processing within the FPGA 202.

Example Low Band Path

Figure 3:
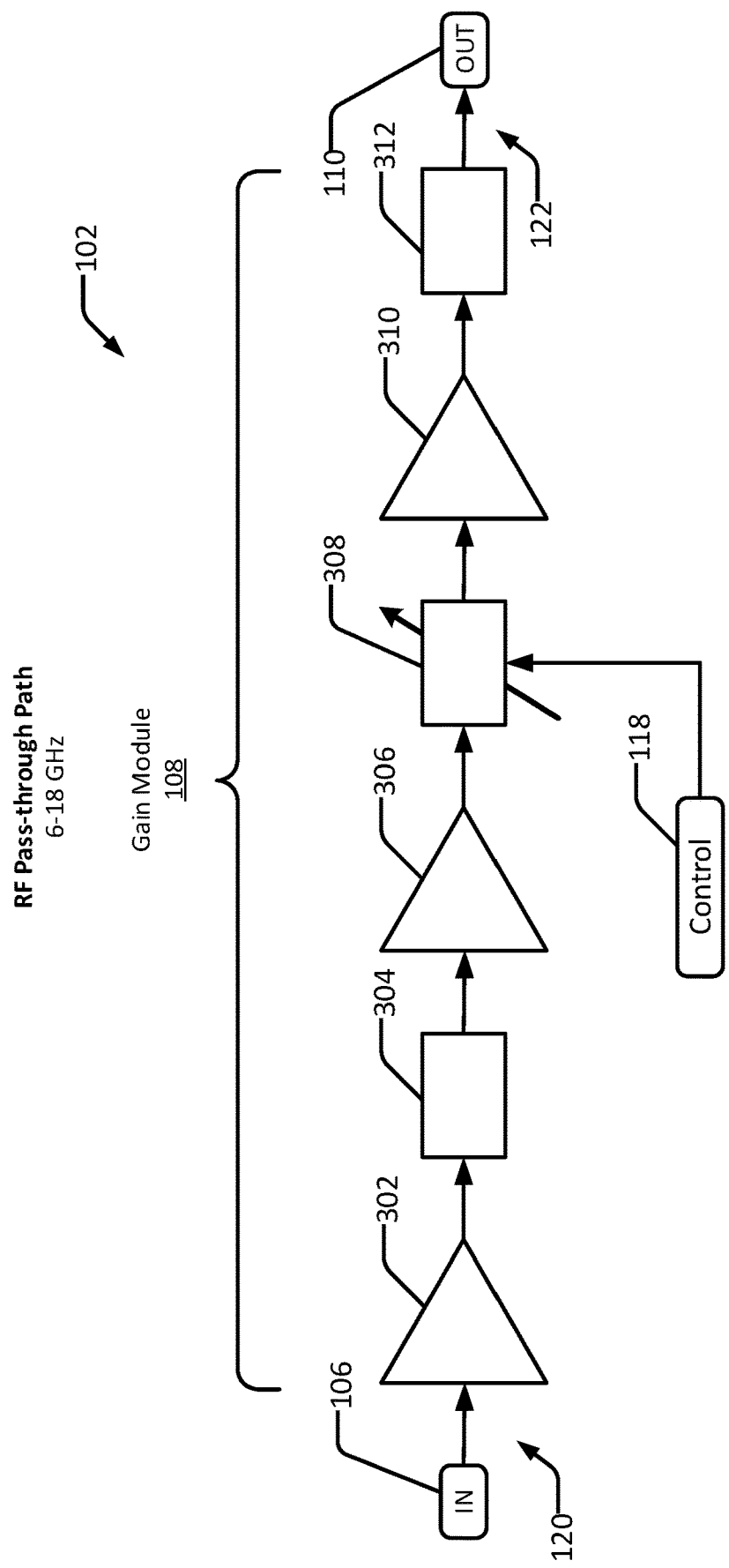
FIG. 3 is a block diagram of the RF pass-through path of FIG. 2, in accordance with an embodiment of the present disclosure.

FIG. 3 is a block diagram of the RF pass-through path 102 of FIGS. 1 and 2, in accordance with an embodiment of the present disclosure. As discussed above, the RF pass-through path 102 is configured to receive the first RF signal 120 at the input port 106 and to transmit the second RF signal 122 at the output port 110. The first RF signal 120 and the second RF signal 122 can each have, for example, a frequency between approximately 6 GHz and approximately 18 GHz. The gain module 108 is configured to amplify the first RF signal 120 to produce the second RF signal 122.

In an example, the gain module 108 includes, in series, a first wideband low noise amplifier 302, a gain equalizer 304, a second wideband low noise amplifier 306, a digitally controlled attenuator 308, a third wideband low noise amplifier 310, and an RF attenuator 312. In some examples, the first, second, and third wideband low noise amplifiers 302, 306, 310 are configured to operate between approximately 2 GHz and approximately 28 GHz and each can be fabricated as a surface mount package having dimensions of 6 millimeters by 6 millimeters or smaller. In some examples, the gain equalizer 304 can be fabricated in a package having dimensions of 2 millimeters by 2 millimeters or smaller. In some examples, the digitally controlled attenuator 308 is a 4-bit attenuator that operates with approximately a 30-dB attenuation range from approximately 100 MHz to approximately 40 GHz. In some examples, the RF attenuator 312 can be fabricated as a surface mount package and operates in a range from DC to approximately 20 GHz.

Example High Band Path

Figure 4:
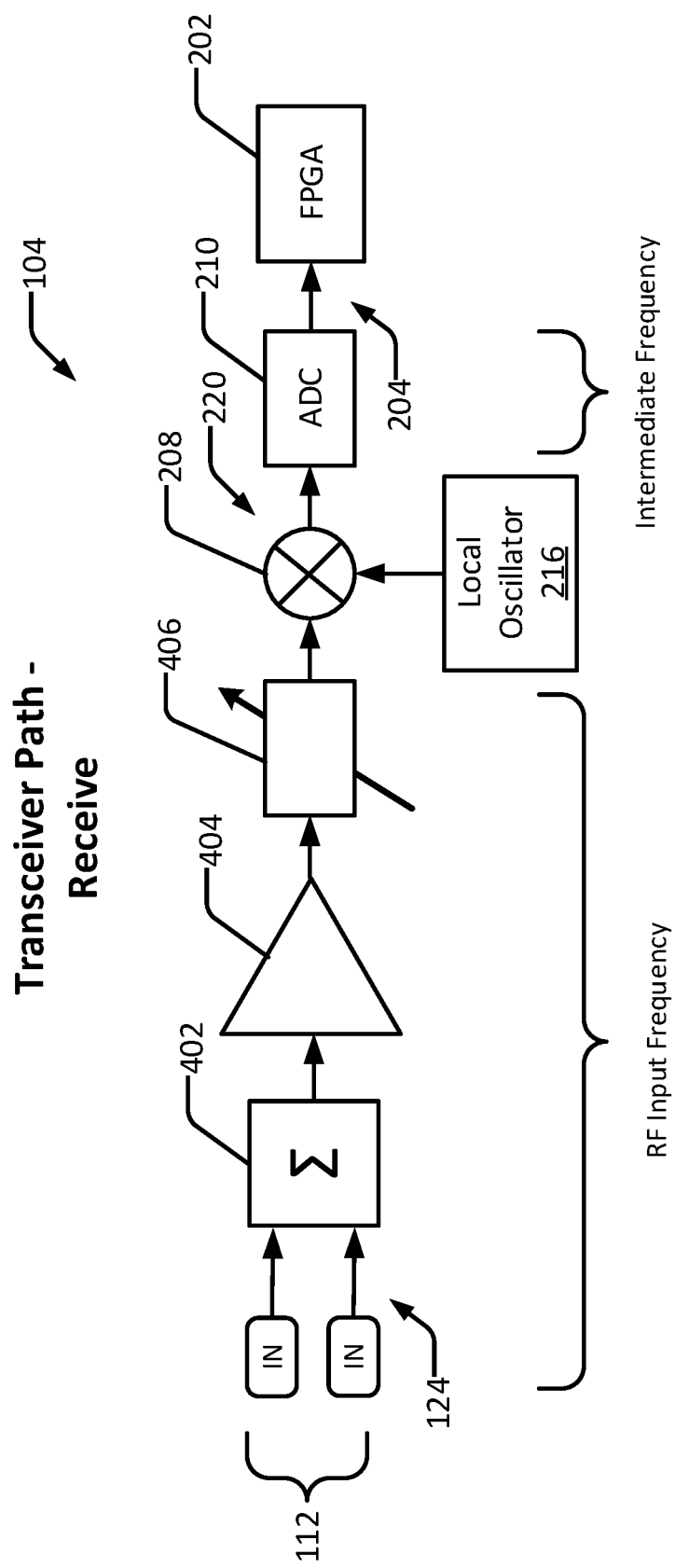
FIG. 4 is a block diagram of a receive portion of the transceiver path of FIG. 2, in accordance with an embodiment of the present disclosure.

FIG. 4 is a block diagram of a receive portion of the transceiver path 104 of FIGS. 1 and 2, in accordance with an embodiment of the present disclosure. As discussed above, the transceiver path 104 is configured to receive the third RF signal 124 at the input port 112. The third RF signal 124 can have, for example, a frequency between approximately 20 GHz and 40 GHz at the input port 112. The transceiver path 104 includes, in series, a wideband signal splitter/combiner 402, a low noise amplifier 404, a digitally controlled attenuator 406, the downconverter 208, the ADC 210, and the FPGA 202.

In some examples, the wideband signal splitter/combiner 402 is configured to operate in the range of approximately 10 GHz to approximately 43.5 GHz and can be fabricated as a surface mount package having dimensions of approximately 3.5 millimeters by approximately 2.5 millimeters. In some examples, the low noise amplifier 404 can be fabricated as a surface mount package having dimensions of 3 millimeters by 3 millimeters or smaller. In some examples, the digitally controlled attenuator 406 is a 4-bit attenuator that operates with approximately a 30-dB attenuation range from approximately 100 MHz to approximately 40 GHz. In some examples, the downconverter 208 is a wideband, microwave downconverter that operates in the range of approximately 24 GHz to approximately 44 GHz.

Figure 5:
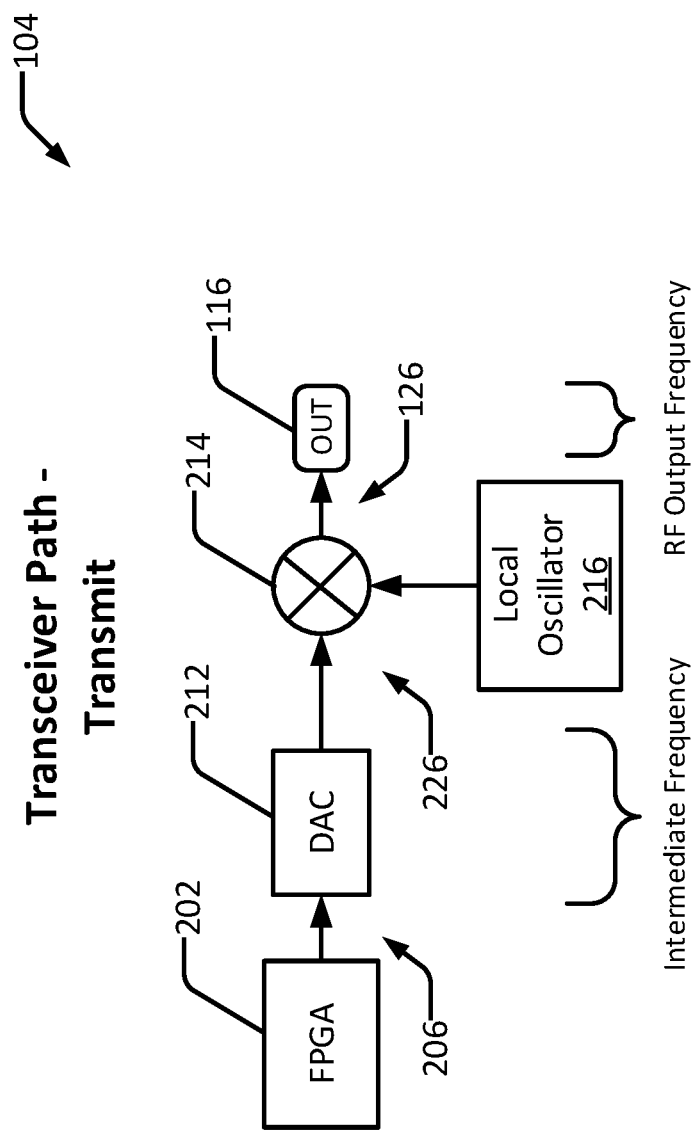
FIG. 5 is a block diagram of a transmit portion of the transceiver path of FIG. 2, in accordance with an embodiment of the present disclosure.

FIG. 5 is a block diagram of a transmit portion of the transceiver path 104 of FIGS. 1 and 2, in accordance with an embodiment of the present disclosure. As discussed above, the transceiver path 104 is configured to transmit the fourth RF signal 126 at the output port 116. The fourth RF signal 126 can have, for example, a frequency between approximately 20 GHz and approximately 40 GHz at the output port 116. The transceiver path 104 includes the FPGA 202, the DAC 212, and the upconverter 214. In some examples, the upconverter 214 is a wideband, microwave upconverter that operates in the range of approximately 24 GHz to approximately 44 GHz.

Clocking

Figure 6:
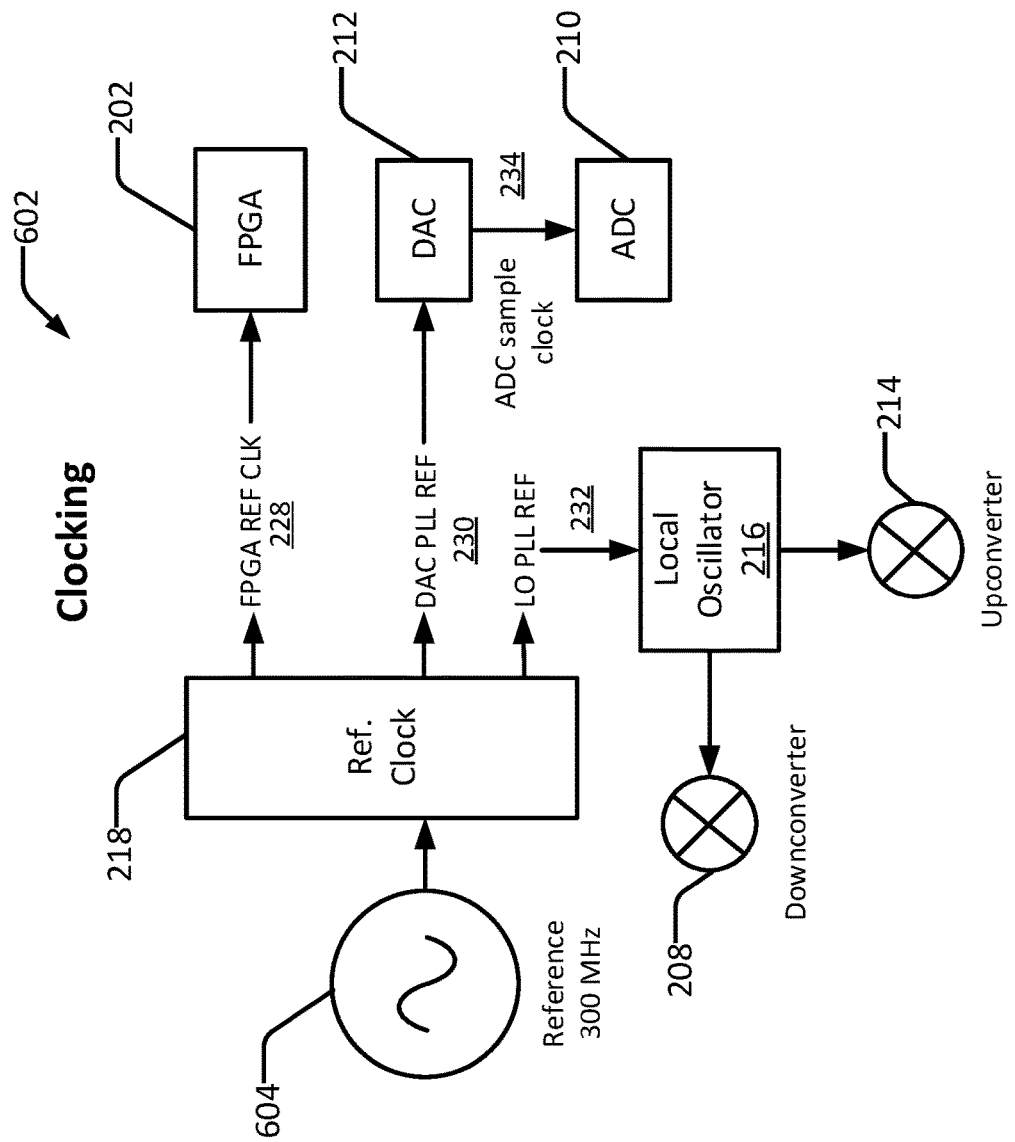
FIG. 6 is a block diagram of a clocking portion of the transceiver of FIGS. 1 and 2, in accordance with an embodiment of the present disclosure.

FIG. 6 is a block diagram of a clocking portion 602 of the transceiver 100 of FIG. 1, in accordance with an embodiment of the present disclosure. The clocking portion 602 includes a reference frequency generator 604 coupled to the reference clock 218. In some examples, the reference frequency generator 604 is configured to generate a reference signal at approximately 300 MHz to drive the reference clock 218. As noted above, the reference clock 218 generates the FPGA reference clock signal 228, which clocks the FPGA 202; the DAC PLL reference clock 230, which provides a reference for the internal PLL of the DAC 212, which clocks the DAC 212, and the LO PLL reference clock 232, which clocks the LO 216. Note that in some examples the ADC 210 is clocked from the DAC 212 via the ADC sample clock 234. The LO 216 clocks the downconverter 208 and the upconverter 214.

Transceiver Methodology

Figure 7:
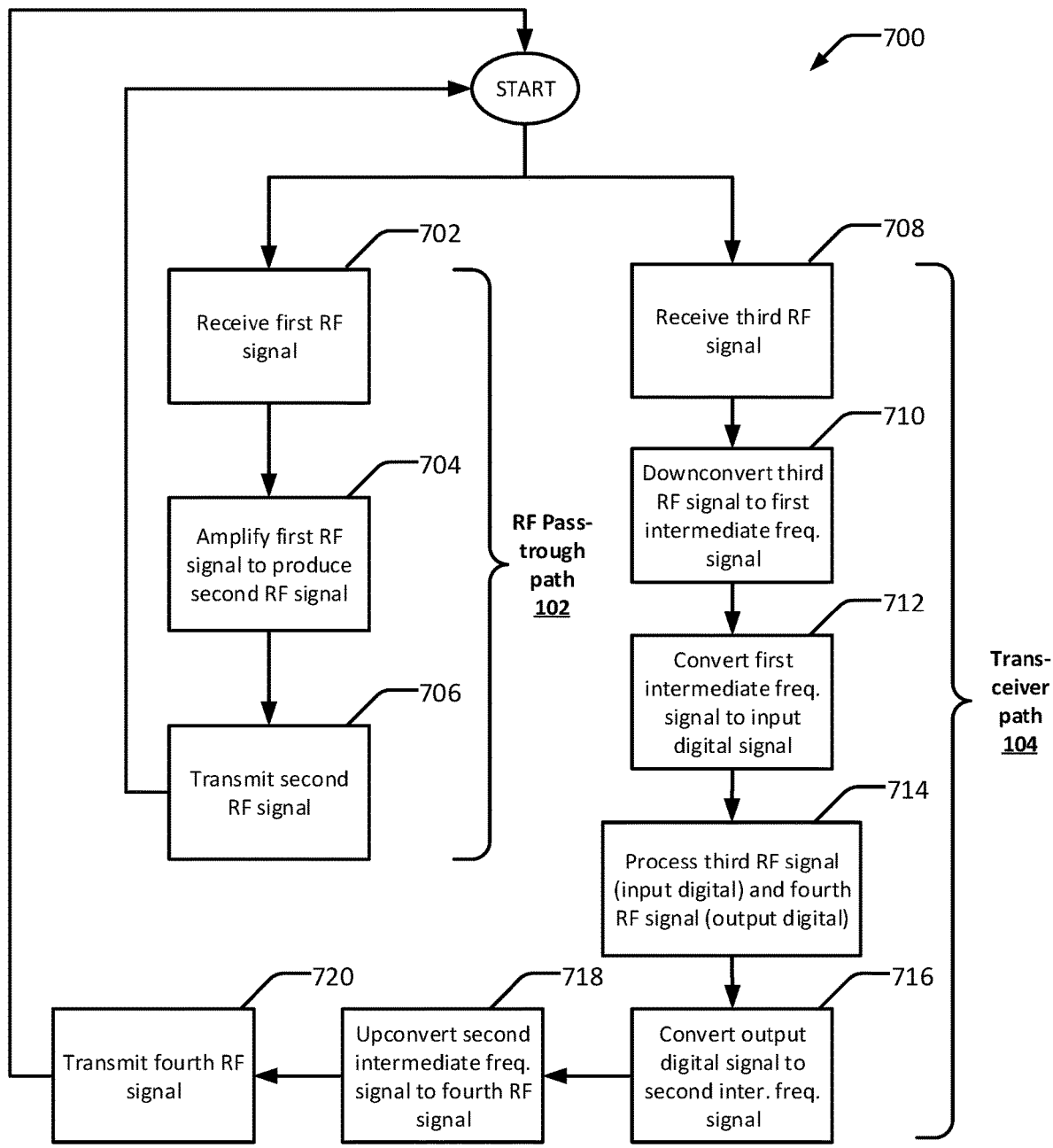
FIG. 7 is a flow diagram of a methodology for processing signals through the transceiver of FIG. 1, in accordance with an embodiment of the present disclosure.

FIG. 7 is a flow diagram of a methodology 700 for processing signals through the transceiver 100 of FIG. 1, in accordance with an embodiment of the present disclosure. The methodology 700 includes receiving 702, along a radio frequency (RF) pass-through path between a first input port and a first output port (e.g., the RF pass-through path 102 of FIG. 1), a first RF signal at a first input port. The methodology 700 further includes amplifying 704, by a gain module (e.g., the gain module 108 of FIG. 1) on the RF pass-through path, the first RF signal to produce a second RF signal, and transmitting 706, along the RF pass-through path, a second RF signal at the first output port.

The methodology 700 further includes receiving 708, along a transceiver path between a second input port and a second output port (e.g., the transceiver path 104 of FIG. 1), a third RF signal at an RF input frequency at the second input port. The methodology 700 further includes downconverting 710 (e.g., by the downconverter 208 of FIG. 2) the third RF signal to a first intermediate frequency signal at the intermediate frequency, and converting 712, by an analog-to-digital signal converter (ADC) (e.g., the ADC 210 of FIG. 2), the first intermediate frequency signal into an input digital signal.

The methodology 700 further includes processing 714, by a signal processor on the transceiver path (e.g., the FPGA 202 of FIG. 2), the third RF signal (e.g., downconverted to the first intermediate frequency signal by the downconverter 208 of FIG. 2 and converted into the input digital signal by the ADC 210 of FIG. 2) and a fourth RF signal (e.g., an output digital signal from the DAC 212 of FIG. 2 upconverted from a second intermediate frequency signal by the upconverter 214 of FIG. 2) at an intermediate frequency that is less than the RF input frequency and an RF output frequency.

The methodology 700 further includes converting 716, by a digital-to-analog converter (DAC) (e.g., the DAC 212 of FIG. 2), an output digital signal (e.g. from the FPGA 202 of FIG. 2) into the second intermediate frequency signal. The methodology 700 further includes upconverting 718 (e.g., by the upconverter 214 of FIG. 2) a second intermediate frequency signal at the intermediate frequency to the fourth RF signal and transmitting 720 the fourth RF signal at the RF output frequency at the second output port.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) or soft-coded (e.g., volatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Further Example Embodiments

The following examples pertain to further embodiments, from which numerous permutations and configurations will be apparent.

Example 1 provides a transceiver including an enclosure, a first input, a second input, a first output, a second output, a radio frequency (RF) pass-through path within the enclosure and between the first input and the first output, the RF pass-through path including a gain module, and a transceiver path within the enclosure and between the second input and the second output, the transceiver path including a signal processor.

Example 2 includes the subject matter of Example 1, wherein the enclosure has a length of approximately 3.00 inches, a width of approximately 1.56 inches, and a height of approximately 0.62 inches.

Example 3 includes the subject matter of any one of Examples 1 and 2, wherein the RF pass-through path is configured to receive a first RF signal at the first input and to transmit a second RF signal at the first output, wherein the first RF signal and the second RF signal have a frequency between approximately 6 GHz and approximately 18 GHz, and wherein the gain module is configured to amplify the first RF signal to produce the second RF signal.

Example 4 includes the subject matter of any one of Examples 1-3, wherein the transceiver path is configured to receive a third RF signal at the second input and to transmit a fourth RF signal at the second output, wherein the third RF signal has an RF input frequency between approximately 20 GHz and approximately 40 GHz at the second input, wherein the fourth RF signal has an RF output frequency between approximately 20 GHz and approximately 40 GHz at the second output, and wherein the signal processor is configured to process the third RF signal and the fourth RF signal at an intermediate frequency that is less than the RF input frequency and the RF output frequency.

Example 5 includes the subject matter of Example 4, wherein the signal processor includes a field programmable gate array (FPGA) configured to process the third RF signal and the fourth RF signal.

Example 6 includes the subject matter of any one of Examples 4 and 5, further including a downconverter, an analog-to-digital signal converter (ADC), a digital-to-analog signal converter (DAC), an upconverter, a local oscillator (LO), and a reference clock.

Example 7 includes the subject matter of Example 4, wherein the signal processor includes a field programmable gate array (FPGA) configured to process the third RF signal and the fourth RF signal, wherein, in a first mode of operation, the downconverter is configured to convert the third RF signal from the RF input frequency to a first intermediate frequency signal having a frequency that is different from the RF input frequency, wherein the ADC is configured to convert the first intermediate frequency signal into an input digital signal, and wherein the FPGA is configured to process the input digital signal and send first data associated with the input digital signal to a control port.

Example 8 includes the subject matter of Example 7, wherein, in a second mode of operation, the FPGA is configured to receive second data from the control port and to generate an output digital signal, wherein the DAC is configured to convert the output digital signal into a second intermediate frequency signal having a frequency that is different from the RF output frequency, and wherein the upconverter is configured to convert the second intermediate frequency signal into the fourth RF signal.

Example 9 includes the subject matter of any one of Examples 4-8, wherein the signal processor includes a field programmable gate array (FPGA) configured to process the third RF signal and the fourth RF signal, wherein the reference clock is configured to generate a reference clock signal that clocks the FPGA, a DAC phase lock loop (PLL) reference clock that clocks the DAC, and a LO PLL reference clock that clocks the LO, and wherein the DAC is configured to distribute a copy of the internal PLL sample clock that clocks the ADC.

Example 10 includes the subject matter of any one of Examples 1-9, wherein the RF pass-through path and the transceiver path are located on a non-hermetic, parylene-coated circuit board.

Example 11 provides a transceiver unit including an enclosure, a first input port, a second input port, a first output port, a second output port, a radio frequency (RF) pass-through path within the enclosure and between the first input port and the first output port, the RF pass-through path including a gain module, the RF pass-through path being configured to receive a first RF signal at the first input port and to transmit a second RF signal at the first output port, the gain module being configured to amplify the first RF signal to produce the second RF signal, and a transceiver path within the enclosure and between the second input port and the second output port, the transceiver path including a signal processor, the transceiver path being configured to receive a third RF signal at the second input port and to transmit a fourth RF signal at the second output port, the signal processor being configured to process the third RF signal and the fourth RF signal at an intermediate frequency that is less than the RF input frequency and the RF output frequency.

Example 12 includes the subject matter of Example 11, wherein the gain module includes, in series, a first wideband low noise amplifier, a gain equalizer, a second wideband low noise amplifier, a digitally controlled attenuator, a third wideband low noise amplifier, and an RF attenuator.

Example 13 includes the subject matter of Example 12, wherein each of the first, second, and third wideband low noise amplifiers are configured to operate between approximately 2 GHz and approximately 28 GHz and be fabricated as a surface mount package having dimensions of 6 millimeters by 6 millimeters or smaller, wherein the gain equalizer is fabricated in a package having dimensions of 2 millimeters by 2 millimeters or smaller, wherein the digitally controlled attenuator is a 4-bit attenuator that operates with approximately a 30-dB attenuation range from approximately 100 MHz to approximately 40 GHz, and wherein the RF attenuator is fabricated as a surface mount package and operates in a range from DC to approximately 20 GHz.

Example 14 includes the subject matter of any one of Examples 11-13, wherein the transceiver path includes, in series, a wideband signal splitter/combiner, a low noise amplifier, a digitally controlled attenuator, a downconverter, and an analog-to-digital signal converter (ADC).

Example 15 includes the subject matter of Example 14, wherein the wideband signal splitter/combiner is configured to operate in the range of approximately 10 GHz to approximately 43.5 GHz and is fabricated as a surface mount package having dimensions of approximately 3.5 millimeters by approximately 2.5 millimeters, wherein the low noise amplifier is fabricated as a surface mount package having dimensions of 3 millimeters by 3 millimeters or smaller, wherein the digitally controlled attenuator is a 4-bit attenuator that operates with approximately a 30-dB attenuation range from approximately 100 MHz to approximately 40 GHz, and wherein the downconverter is a wideband, microwave downconverter that operates in the range of approximately 24 GHz to approximately 44 GHz.

Example 16 includes the subject matter of any one of Examples 11-15, wherein the transceiver path includes, in series, a digital-to-analog signal converter (DAC) and an upconverter.

Example 17 includes the subject matter of Example 16, wherein the upconverter is a wideband, microwave upconverter that operates in the range of approximately 24 GHz to approximately 44 GHz.

Example 18 provides a method of processing a signal, the method including receiving, along a radio frequency (RF) pass-through path between a first input port and a first output port, a first RF signal at a first input port; amplifying, by a gain module on the RF pass-through path, the first RF signal to produce a second RF signal; transmitting, along the RF pass-through path, a second RF signal at the first output port; receiving, along a transceiver path between a second input port and a second output port, a third RF signal at an RF input frequency at the second input port; processing, by a signal processor on the transceiver path, the third RF signal and a fourth RF signal at an intermediate frequency that is less than the RF input frequency and an RF output frequency; and transmitting the fourth RF signal at the RF output frequency at the second output port.

Example 19 includes the subject matter of Example 18, further including downconverting the third RF signal to a first intermediate frequency signal at the intermediate frequency, and upconverting a second intermediate frequency signal at the intermediate frequency to the fourth RF signal.

Example 20 includes the subject matter of Example 19, further comprising converting, by an analog-to-digital signal converter (ADC), the first intermediate frequency signal into an input digital signal, and converting, by a digital-to-analog converter (DAC), an output digital signal into the second intermediate frequency signal.

Example 21 provides a method of manufacturing a transceiver, the method including providing a radio frequency (RF) pass-through path within an enclosure and between a first input and a first output, the RF pass-through path including a gain module; and providing a transceiver path within the enclosure and between a second input and a second output, the transceiver path including a signal processor.

Example 22 includes the subject matter of Example 21, wherein the enclosure has a length of approximately 3.00 inches, a width of approximately 1.56 inches, and a height of approximately 0.62 inches.

Example 23 includes the subject matter of any one of Examples 21-22, wherein the RF pass-through path is configured to receive a first RF signal at the first input and to transmit a second RF signal at the first output, wherein the first RF signal and the second RF signal have a frequency between approximately 6 GHz and approximately 18 GHz, and wherein the gain module is configured to amplify the first RF signal to produce the second RF signal.

Example 24 includes the subject matter of any one of Examples 21-23, wherein the transceiver path is configured to receive a third RF signal at the second input and to transmit a fourth RF signal at the second output, wherein the third RF signal has an RF input frequency between approximately 20 GHz and approximately 40 GHz at the second input, wherein the fourth RF signal has an RF output frequency between approximately 20 GHz and approximately 40 GHz at the second output, and wherein the signal processor is configured to process the third RF signal and the fourth RF signal at an intermediate frequency that is less than the RF input frequency and the RF output frequency.

Example 25 includes the subject matter of Example 24, wherein the signal processor includes a field programmable gate array (FPGA) configured to process the third RF signal and the fourth RF signal.

Example 26 includes the subject matter of any one of Examples 24-25, wherein the signal processor includes a field programmable gate array (FPGA) configured to process the third RF signal and the fourth RF signal, the method further comprising providing each of a downconverter, an analog-to-digital signal converter (ADC), a digital-to-analog signal converter (DAC), an upconverter, a local oscillator (LO), and a reference clock, wherein, in a first mode of operation, the downconverter is configured to convert the third RF signal from the RF input frequency to a first intermediate frequency signal having a frequency that is different from the RF input frequency, wherein the ADC is configured to convert the first intermediate frequency signal into an input digital signal, and wherein the FPGA is configured to process the input digital signal and send first data associated with the input digital signal to a control port.

Example 27 includes the subject matter of any one of Examples 24-26, wherein, in a second mode of operation, the FPGA is configured to receive second data from the control port and to generate an output digital signal, wherein the DAC is configured to convert the output digital signal into a second intermediate frequency signal having a frequency that is different from the RF output frequency, and wherein the upconverter is configured to convert the second intermediate frequency signal into the fourth RF signal.

Example 28 includes the subject matter of any one of Examples 26-27, wherein the reference clock is configured to generate a reference clock signal that clocks the FPGA, a DAC phase lock loop (PLL) reference clock that clocks the DAC, and a LO PLL reference clock that clocks the LO, and wherein the DAC is configured to distribute a copy of an internal PLL sample clock that clocks the ADC.

Example 29 includes the subject matter of any one of Examples 21-28, wherein the RF pass-through path and the transceiver path are located on a non-hermetic, parylene-coated circuit board.

Example 30 provides a method of making a transceiver unit, the method including providing a radio frequency (RF) pass-through path within an enclosure and between a first input port and a first output port, the RF pass-through path including a gain module, the RF pass-through path being configured to receive a first RF signal at the first input port and to transmit a second RF signal at the first output port, the gain module being configured to amplify the first RF signal to produce the second RF signal; and providing a transceiver path within the enclosure and between a second input port and a second output port, the transceiver path including a signal processor, the transceiver path being configured to receive a third RF signal at the second input port and to transmit a fourth RF signal at the second output port, the signal processor being configured to process the third RF signal and the fourth RF signal at an intermediate frequency that is less than the RF input frequency and the RF output frequency.

Example 31 includes the subject matter of Example 30, wherein the gain module includes, in series, a first wideband low noise amplifier, a gain equalizer, a second wideband low noise amplifier, a digitally controlled attenuator, a third wideband low noise amplifier, and an RF attenuator.

Example 32 includes the subject matter of any one of Examples 30-31, wherein each of the first, second, and third wideband low noise amplifiers are configured to operate between approximately 2 GHz and approximately 28 GHz and be fabricated as a surface mount package having dimensions of 6 millimeters by 6 millimeters or smaller, wherein the gain equalizer is fabricated in a package having dimensions of 2 millimeters by 2 millimeters or smaller, wherein the digitally controlled attenuator is a 4-bit attenuator that operates with approximately a 30-dB attenuation range from approximately 100 MHz to approximately 40 GHz, and wherein the RF attenuator is fabricated as a surface mount package and operates in a range from DC to approximately 20 GHz.

Example 33 includes the subject matter of any one of Examples 30-32, wherein the transceiver path includes, in series, a wideband signal splitter/combiner, a low noise amplifier, a digitally controlled attenuator, a downconverter, and an analog-to-digital signal converter (ADC).

Example 34 includes the subject matter of Example 33, wherein the wideband signal splitter/combiner is configured to operate in the range of approximately 10 GHz to approximately 43.5 GHz and is fabricated as a surface mount package having dimensions of approximately 3.5 millimeters by approximately 2.5 millimeters, wherein the low noise amplifier is fabricated as a surface mount package having dimensions of 3 millimeters by 3 millimeters or smaller, wherein the digitally controlled attenuator is a 4-bit attenuator that operates with approximately a 30-dB attenuation range from approximately 100 MHz to approximately 40 GHz, and wherein the downconverter is a wideband, microwave downconverter that operates in the range of approximately 24 GHz to approximately 44 GHz.

Example 35 includes the subject matter of any one of Examples 30-34, wherein the transceiver path includes, in series, a digital-to-analog signal converter (DAC) and an upconverter.

Example 36 includes the subject matter of Example 35, wherein the upconverter is a wideband, microwave upconverter that operates in the range of approximately 24 GHz to approximately 44 GHz.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A transceiver, comprising:
   an enclosure;
   a first input, a second input, a first output, and a second output;
   a radio frequency (RF) pass-through path within the enclosure and between the first input and the first output, the RF pass-through path including a gain module; and
   a transceiver path within the enclosure and between the second input and the second output, the transceiver path including a signal processor;
   wherein the transceiver path is configured to receive a third RF signal at the second input and to transmit a fourth RF signal at the second output, wherein the third RF signal has an RF input frequency between approximately 20 GHz and approximately 40 GHz at the second input, wherein the fourth RF signal has an RF output frequency between approximately 20 GHz and approximately 40 GHz at the second output, and wherein the signal processor is configured to process the third RF signal and the fourth RF signal at an intermediate frequency that is less than the RF input frequency and the RF output frequency.

2. The transceiver of claim 1, wherein the enclosure has a length of approximately 3.00 inches, a width of approximately 1.56 inches, and a height of approximately 0.62 inches.

3. The transceiver of claim 1, wherein the RF pass-through path is configured to receive a first RF signal at the first input and to transmit a second RF signal at the first output, wherein the first RF signal and the second RF signal have a frequency between approximately 6 GHz and approximately 18 GHz, and wherein the gain module is configured to amplify the first RF signal to produce the second RF signal.

4. The transceiver of claim 1, wherein the signal processor includes a field programmable gate array (FPGA) configured to process the third RF signal and the fourth RF signal.

5. The transceiver of claim 1, further comprising a downconverter, an analog-to-digital signal converter (ADC), a digital-to-analog signal converter (DAC), an upconverter, a local oscillator (LO), and a reference clock.

6. The transceiver of claim 1, wherein the signal processor includes a field programmable gate array (FPGA) configured to process the third RF signal and the fourth RF signal, and wherein, in a first mode of operation, the downconverter is configured to convert the third RF signal from the RF input frequency to a first intermediate frequency signal having a frequency that is different from the RF input frequency, wherein the ADC is configured to convert the first intermediate frequency signal into an input digital signal, and wherein the FPGA is configured to process the input digital signal and send first data associated with the input digital signal to a control port.

7. The transceiver of claim 6, wherein, in a second mode of operation, the FPGA is configured to receive second data from the control port and to generate an output digital signal, wherein the DAC is configured to convert the output digital signal into a second intermediate frequency signal having a frequency that is different from the RF output frequency, and wherein the upconverter is configured to convert the second intermediate frequency signal into the fourth RF signal.

8. The transceiver of claim 1, wherein the signal processor includes a field programmable gate array (FPGA) configured to process the third RF signal and the fourth RF signal, and wherein the reference clock is configured to generate a reference clock signal that clocks the FPGA, a DAC phase lock loop (PLL) reference clock that clocks the DAC, and a LO PLL reference clock that clocks the LO, and wherein the DAC is configured to distribute a copy of an internal PLL sample clock that clocks the ADC.

9. The transceiver of claim 1, wherein the RF pass-through path and the transceiver path are located on a non-hermetic, parylene-coated circuit board.

10. A transceiver unit, comprising:
an enclosure;
a first input port, a second input port, a first output port, and a second output port;
a radio frequency (RF) pass-through path within the enclosure and between the first input port and the first output port, the RF pass-through path including a gain module, the RF pass-through path being configured to receive a first RF signal at the first input port and to transmit a second RF signal at the first output port, the gain module being configured to amplify the first RF signal to produce the second RF signal;
wherein the gain module includes, in series, a first wideband low noise amplifier, a gain equalizer, a second wideband low noise amplifier, a digitally controlled attenuator, a third wideband low noise amplifier, and an RF attenuator;
wherein each of the first, second, and third wideband low noise amplifiers are configured to operate between approximately 2 GHz and approximately 28 GHz and be fabricated as a surface mount package having dimensions of 6 millimeters by 6 millimeters or smaller, wherein the gain equalizer is fabricated in a package having dimensions of 2 millimeters by 2 millimeters or smaller, wherein the digitally controlled attenuator is a 4-bit attenuator that operates with approximately a 30-dB attenuation range from approximately 100 MHz to approximately 40 GHZ, and wherein the RF attenuator is fabricated as a surface mount package and operates in a range from DC to approximately 20 GHz; and
a transceiver path within the enclosure and between the second input port and the second output port, the transceiver path including a signal processor, the transceiver path being configured to receive a third RF signal at the second input port and to transmit a fourth RF signal at the second output port, the signal processor being configured to process the third RF signal and the fourth RF signal at an intermediate frequency that is less than the RF input frequency and the RF output frequency.

11. The transceiver unit of claim 10, wherein the transceiver path includes, in series, a wideband signal splitter/combiner, a low noise amplifier, a digitally controlled attenuator, a downconverter, and an analog-to-digital signal converter (ADC).

12. The transceiver unit of claim 11, wherein the wideband signal splitter/combiner is configured to operate in the range of approximately 10 GHz to approximately 43.5 GHz and is fabricated as a surface mount package having dimensions of approximately 3.5 millimeters by approximately 2.5 millimeters, wherein the low noise amplifier is fabricated as a surface mount package having dimensions of 3 millimeters by 3 millimeters or smaller, wherein the digitally controlled attenuator is a 4-bit attenuator that operates with approximately a 30-dB attenuation range from approximately 100 MHz to approximately 40 GHz, and wherein the downconverter is a wideband, microwave downconverter that operates in the range of approximately 24 GHz to approximately 44 GHz.

13. The transceiver unit of claim 10, wherein the transceiver path includes, in series, a digital-to-analog signal converter (DAC) and an upconverter.

14. The transceiver unit of claim 13, wherein the upconverter is a wideband, microwave upconverter that operates in the range of approximately 24 GHz to approximately 44 GHz.

15. A method of manufacturing a transceiver, the method comprising: providing a radio frequency (RF) pass-through path within an enclosure and between a first input and a first output, the RF pass-through path including a gain module; providing a transceiver path within the enclosure and between a second input and a second output, the transceiver path including a signal processor; wherein the RF pass-through path is configured to receive a first RF signal at the first input and to transmit a second RF signal at the first output, wherein the first RF signal and the second RF signal have a frequency between approximately 6 GHz and approximately 18 GHZ, and wherein the gain module is configured to amplify the first RF signal to produce the second RF signal; and wherein the transceiver path is configured to receive a third RF signal at the second input and to transmit a fourth RF signal at the second output, wherein the third RF signal has an RF input frequency between approximately 20 GHz and approximately 40 GHz at the second input, wherein the fourth RF signal has an RF output frequency between approximately 20 GHz and approximately 40 GHz at the second output, and wherein the signal processor is configured to process the third RF signal and the fourth RF signal at an intermediate frequency that is less than the RF input frequency and the RF output frequency.

* * * * *